United States Patent [19]

Frelau

[11] 4,140,041
[45] Feb. 20, 1979

[54] EXPLOSIVE-FORMING DEVICE FOR THE OBTURATION OF A PIPE BY COMPRESSION

[75] Inventor: Paul Frelau, Monts, France

[73] Assignee: Commissariat a l'Energie Atomique, Paris, France

[21] Appl. No.: 789,715

[22] Filed: Apr. 21, 1977

[30] Foreign Application Priority Data

Apr. 29, 1976 [FR] France .................................. 76 12749

[51] Int. Cl.² .......................... F16L 55/10; E21B 33/06
[52] U.S. Cl. ..................................... 89/1 B; 137/68 A; 251/1A; 166/55
[58] Field of Search .......................... 72/57; 29/421 E; 137/67, 68 A; 251/5, 7; 228/2.5; 102/24; 89/1 B; 255/1 A; 166/55

[56] References Cited

U.S. PATENT DOCUMENTS

| | | | |
|---|---|---|---|
| 2,149,641 | 3/1939 | Temple, Jr. ........................ | 29/241 E |
| 3,018,793 | 1/1962 | Aagaard .................................... | 251/5 |
| 3,517,907 | 6/1970 | Bach .................................. | 29/421 E |

FOREIGN PATENT DOCUMENTS

| | | | |
|---|---|---|---|
| 163965 | 10/1953 | Australia ...................................... | 251/5 |
| 1086956 | 8/1960 | Fed. Rep. of Germany .............. | 251/7 |

OTHER PUBLICATIONS

Military Explosives, Dept. of Army Tech. Man. TM 9-1910, Apr., 1955, UF 523 A51, 1955 C4, p. 257.

*Primary Examiner*—Verlin R. Pendegrass
*Attorney, Agent, or Firm*—Thomas R. Boland

[57] ABSTRACT

A chamber formed at the lower end of a jack piston is made pressure-tight by means of a seal between the lateral walls of the piston and the jack cylinder and contains a gunpowder cartridge for actuating the jack. Two members located on each side of the pipe to be obturated by compression are intended to be driven together by firing the cartridge. One member is rigidly fixed to the jack piston and guided freely in translational motion by means of tie-bolts which serve to secure the other member to the jack cylinder.

6 Claims, 4 Drawing Figures

EXPLOSIVE-FORMING DEVICE FOR THE OBTURATION OF A PIPE BY COMPRESSION

This invention relates to an explosive-forming device for the obturation of a pipe by compression and more especially for rapid and pressure-tight obturation of a pipe which conveys a hazardous fluid.

Explosive-forming devices which have been designed in accordance with the prior art for blanking-off or obturating a pipe usually comprise elements displaced by explosive means and capable of obstructing the pipe by penetrating into this latter.

Thus the main disadvantage of devices of this type lies in the fact that accurate manufacture is required in order to adapt such devices to a given type of piping, in the fact that highly complex operations are involved in mounting the devices within pipes and also in the fact that the flow of fluid is disturbed prior to obturation.

The present invention is precisely directed to a device for obturating a pipe which makes it possible to overcome these drawbacks and offers in addition many advantages relating in particular to the pressure-tight character of the obturation and the rapidity with which said obturation is obtained.

The explosive-forming device for the obturation of a pipe in accordance with the present invention essentially comprises:

a jack constituted by a piston and a cylinder, said piston being provided at the lower end thereof with a chamber which delimits a compartment with the bottom wall of said jack cylinder, said compartment being made pressure-tight by means of a seal interposed between the lateral walls of said jack piston and of said jack cylinder, explosive means for actuating said jack which are placed within said compartment, a system for firing said explosive means which actuate said jack, two members located on each side of the pipe and intended to be driven together in order to obturate said pipe at the time of firing of said explosive means for actuating the jack, one of the members aforesaid being rigidly fixed to the piston of said jack and the other member being coupled mechanically to the cylinder of said jack by means of tie-bolt, said member which is rigidly fixed to said piston being guided freely in translational motion by means of said tie-bolts.

The device as set forth in the foregoing is of simple construction and is particularly suitable for the obturation of a pipe which serves to convey a hazardous fluid since the device is located completely outside the pipe. This makes it possible to avoid all problems arising from work performed on a pipe of this type and from materials which are introduced into this latter and which may be incompatible with the fluid to be conveyed.

A further advantage of said device is that this latter also permits simultaneous obturation of a plurality of pipes.

In accordance with the invention, the weights of the components of the device which are set in motion at the time of firing of the above-mentioned explosive means, namely the weight of the members, of the jack piston and jack cylinder and of the tie-bolts are preferably chosen so as to ensure that the displacements of said members which are driven together are of equal value.

Thus it is possible to obturate a pipe without inducing an appreciable displacement of its axis.

Furthermore and in accordance with the invention, the members aforesaid have a shape which is intended to produce a deformation of the pipe in such a manner as to achieve leak-tight obturation of the pipe.

In the case of members having a given shape, it is also possible to place a sleeve of elastomer inside the pipe in order to perfect leak-tightness of obturation.

In accordance with a particular embodiment of the device according to the invention, the explosive means aforesaid preferably consist of a cartridge of gunpowder having a base of nitroglycerin and nitrocellulose in which the igniter can be of low intensity.

Moreover and in accordance with this mode of execution, the system for firing the explosive means aforesaid comprises an electrical pulse generator adapted to the igniter of said means and a detector for actuating said generator.

Thus the device in accordance with the particular mode of execution of the invention mentioned in the foregoing has a very short response time of less than 10 milliseconds (this response time corresponds to the time required for obtaining obturation of the pipe when an obturation order is given by a shock transducer, for example).

Further properties and advantages of the present invention will become more clearly apparent from the following description of examples of construction and utilization of the device in accordance with the invention which are given by way of illustration but not in any limiting sense, reference being made to the accompanying drawings, wherein.

Figure 1:
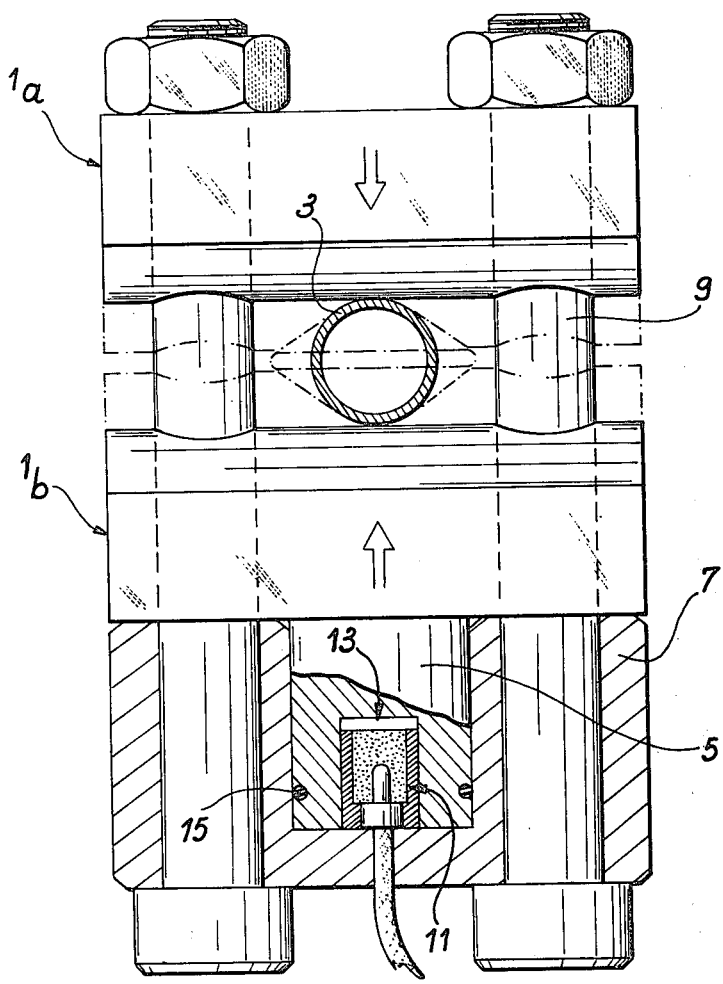
FIG. 1 is a longitudinal sectional view of the device in accordance with the invention.

From FIG. 1, it is apparent that the device in accordance with the invention has two members 1a and 1b which are intended to obturate the pipe 3 under compressive force as they are driven together.

To this end, said members 1a and 1b are capable of cooperating with an explosion-operated jack, the piston and cylinder of which are designated respectively by the references 5 and 7.

Thus in accordance with one of the essential features of the invention, said member 1b is rigidly fixed to said piston 5 of the explosion-operated jack while said member 1a is coupled mechanically to the jack cylinder 7 by means of the tie-bolts 9, said tie-bolts being intended to guide said member 1b freely in translational motion.

It is further apparent from FIG. 1 that said piston 5 is provided at the lower end thereof with a chamber 13 which delimits in conjunction with the bottom wall of the jack cylinder 7 a compartment for an explosive charge or cartridge 11.

It may also be noted that pressure-tightness between the piston 5 and the cylinder 7 of the jack is ensured by means of the seal 15.

In known manner, the cartridge 11 aforesaid contains within an insulating sheath preferably formed of Plexiglas on the one hand a suitable mass of gunpowder, taking into account the inertia of the components to be set in motion and the energy of deformation of the pipe and, on the other hand an igniter embedded in said gunpowder and fixed on said sheath, said igniter being connected to an electrical firing system which is not illustrated in this figure.

In the case of the device according to the invention, the gunpowder is preferably a powder having a base of nitroglycerine and graphitized nitrocellulose and stabilized with diphenylamine and the igniter is of low intensity.

The operation of the device described in the foregoing is as follows:

Firing of the cartridge 11 releases a sufficient quantity of gas to displace the jack cylinder 7 and the jack piston 5 towards each other. The tie-bolts 9 are drawn with the cylinder 7, with the result that the members 1a and 1b are driven together and result in compression of the pipe 3.

The parameters of a preferential application of the device for obturating a stainless steel pipe without inducing any appreciable displacement of its axis, the diameter of said pipe being within the range of 22 to 80 mm and said pipe being intended to convey a fluid under a pressure within the range of $10^{-4}$ to 5 torr are as follows:

weights of the different components which are set in motion:
Member 1a: 400 g
Member 1b + piston 5: 1400 g
Jack cylinder 7: 400 g
Tie-bolts 9: 600 g mass of a double-base powder GBSe 120: 400 mg in the example of a stainless steel tube $\phi$ 20-22 mm,
igniter which is marketed under the reference B66 by Davey Bickford,
a firing system comprising an electrical pulse generator adapted to the igniter and a detector for actuating said generator.

In the case of the parameters of construction of the device mentioned in the foregoing, the mean obturation time is 5 ms and leak-tightness of obturation is approximately $9 \times 10^{-4}$ atmosphere cm$^3$/second.

Moreover, by placing a sleeve of elastomer inside the pipe opposite to the members 1a and 1b of suitable shape, leak-tightness of obturation is approximately $10^{-9}$ atmosphere cm$^3$/second.

Figure 2:
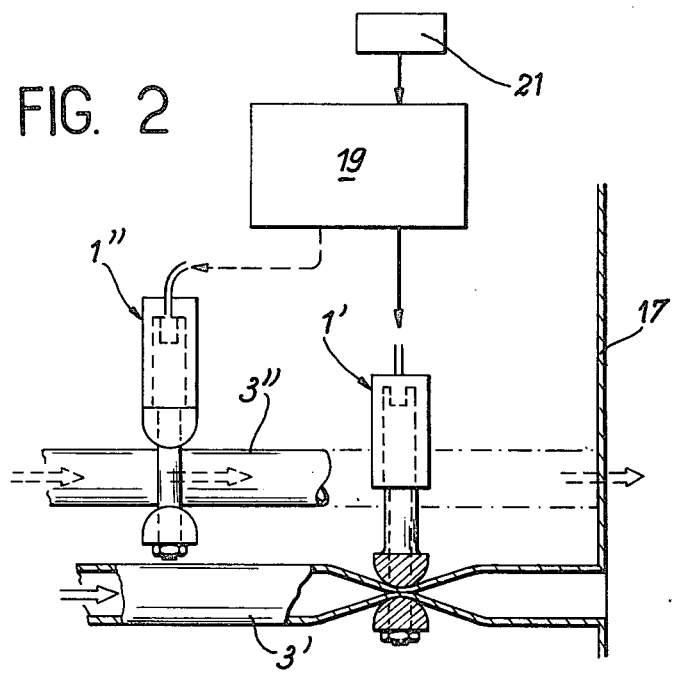
FIG. 2 is a sectional view of one example of utilization of the device in accordance with the invention for the obturation of a pipe which forms part of a circuit for admission or discharge of a fluid into or from a storage tank.

There are shown diagrammatically in FIG. 2 two devices 1' and 1" which, as in the case of the device shown in FIG. 1, are utilized for the obturation of the pipes 3' and 3" corresponding for example to ducts for the admission and discharge of a fluid into and from a storage tank 17.

It can be seen in this figure that the igniters of the obturation devices 1' and 1" are connected to a firing device 19 which is capable of delivering the electrical pulses into the resistors of the igniters for initiation of these latter. Said firing device is actuated by a detector 21 which is suitable for the detection of any desired physical quantity (temperature, acceleration, pressure and the like).

Thus, for the above utilization of the devices 1' and 1", obturation of one of the pipes 3' and 3" is rapidly obtained when the detector is subjected, for example, to a temperature rise which attains a preset threshold value or to a shock.

Figure 3A:
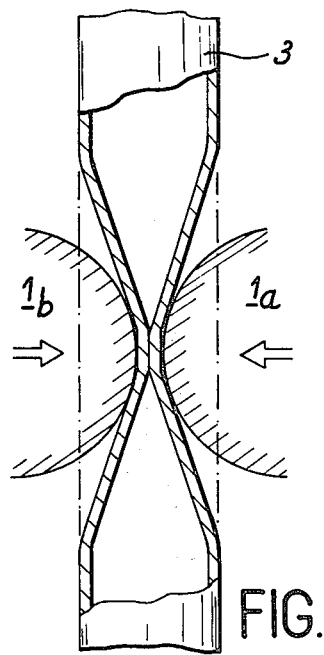
FIGS. 3a and 3b are transverse sectional views of two particular forms of construction of the members of the device between which the pipe is compressed.
Figure 3B:
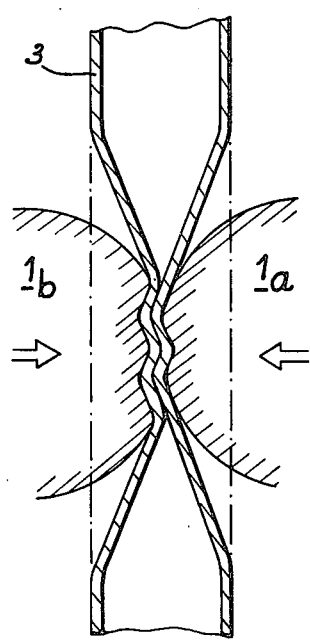

In FIGS. 3a and 3b, there have been shown two examples of construction of the members 1a and 1b mentioned in the foregoing.

It can be seen in FIG. 3a that each of the members 1a, 1b has a U-shaped cross-section. It is apparent from FIG. 3b that said member 1a has an M-shaped cross-section whilst said member 1b has a cross-section in the shape of a W. Members 1a and 1b of this type having cross-sections in the shape of an M and a W can advantageously be associated with a sleeve of elastomer.

What we claim is:

1. An explosive-forming device for the obturation of a pipe, wherein said device comprises:
   a jack constituted by a piston and a cylinder, said piston being provided at the lower end thereof with a chamber which delimits a compartment with the bottom wall of said jack cylinder, said compartment being made pressure-tight by means of a seal interposed between the lateral walls of said jack piston and of said jack cylinder,
   explosive means for actuating said jack which are placed within said compartment,
   a system for firing said explosive means which actuate said jack,
   two members located on each side of the pipe and intended to be driven together in order to obturate said pipe at the time of firing of said explosive means for actuating said jack, one of the members aforesaid being rigidly fixed to the piston of said jack and the other member being coupled mechanically to the cylinder of said jack by means of tie-bolts, said member which is rigidly fixed to said piston being guided freely in translational motion by means of said tie-bolts.

2. A device according to claim 1, wherein the weight of said members, of said jack piston and said jack cylinder and of said tie-bolts is such as to ensure that compression of said pipe takes place without any appreciable displacement of its axis.

3. A device according to claim 1, wherein said explosive means consist of a cartridge of gunpowder having a base of nitroglycerine and nitrocellulose in which the igniter is of low intensity.

4. A device according to claim 1, wherein said members have a shape which is capable of producing a deformation of the pipe in order to ensure leak-tight obturation of said pipe.

5. A device according to claim 1, wherein said device further comprises a sleeve of elastomer which is placed inside the pipe.

6. A device for use in obturation of a pipe comprising,
   a jack consisting of a cylinder and a piston moveably mounted in said cylinder,
   means interposed between the lateral walls of said piston and said cylinder to effect a pressure-tight seal,
   a chamber in the bottom portion of said piston to receive an explosive charge, said chamber delimiting a compartment with the bottom wall of said cylinder,
   a pair of members adapted to bracket a pipe, a first said member being fixedly attached to the top portion of said piston and a second said member being mechanically coupled to said cylinder by tie-bolt means, said first member being guided freely in translational motion by said tie-bolt means, and
   means adapted to fire an explosive charge when contained in said compartment, thereby producing a substantially equal displacement of said members towards each other and causing the desired obturation of the bracketed pipe.

* * * * *